US012591860B2

(12) United States Patent
Jackson

(10) Patent No.: US 12,591,860 B2
(45) Date of Patent: Mar. 31, 2026

(54) OPERATIONAL SIMULATIONS OF PLANNED MAINTENANCE FOR VEHICLES

(71) Applicant: The Boeing Company, Arlington, VA (US)

(72) Inventor: Bronwyn A. Jackson, Seattle, WA (US)

(73) Assignee: The Boeing Company, Arlington, VA (US)

( * ) Notice: Subject to any disclaimer, the term of this patent is extended or adjusted under 35 U.S.C. 154(b) by 105 days.

(21) Appl. No.: 18/538,961

(22) Filed: Dec. 13, 2023

(65) Prior Publication Data

US 2025/0200525 A1      Jun. 19, 2025

(51) Int. Cl.
*G06Q 10/06*          (2023.01)
*G06Q 10/10*          (2023.01)
*G06Q 10/20*          (2023.01)
*G06Q 30/02*          (2023.01)
*G06Q 30/06*          (2023.01)

(52) U.S. Cl.
CPC .................................... *G06Q 10/20* (2013.01)

(58) Field of Classification Search
CPC ..................................................... G06Q 10/20
USPC ................................................... 705/1.1–912
See application file for complete search history.

(56) References Cited

U.S. PATENT DOCUMENTS 6,314,361 B1 * 11/2001 Yu .............................. G08G 5/22
                                                               703/22
8,504,396 B2 * 8/2013 Quintus ............. G06Q 30/0201
                                                                703/2

9,008,892 B2 * 4/2015 Bollapragada ......... G07C 5/006
                                                               702/183
10,204,323 B1 * 2/2019 Miller .................... G07C 5/008
11,295,276 B1 * 4/2022 Slakey ................... G06Q 10/20
2014/0067695 A1 3/2014 Black et al.
(Continued)

OTHER PUBLICATIONS

Wedgewood et al. "Performance modeling of interacting human-machine distributed processes: Building a Simulation Model to Characterize Interacting Workflows and to Explore New Workflow Alternatives", Case Study, Lockheed Martin at the AnyLogic Conference 2015. (Year: 2015).*

(Continued)

*Primary Examiner* — Jonathan P Ouellette
(74) *Attorney, Agent, or Firm* — Alleman Hall LLP

(57)                    ABSTRACT

Implementations for operational simulations of planned maintenance effects for a plurality of vehicles are provided. One aspect provides a computing system comprising processing circuitry configured to provide a plurality of operational models that comprises a route model, a preparation model, and a planned maintenance model. The processing circuitry is further configured to, using the plurality of operational models, execute an operational simulation that generates interactions between a route simulation and a planned maintenance simulation for a plurality of routes in a route schedule, wherein executing the operational simulation comprises simulating performance of a scheduled maintenance task for a vehicle of the plurality of vehicles and determining an effect of the simulated performance of the scheduled maintenance task on the route simulation. The processing circuitry is further configured to output the effect of the simulated performance.

20 Claims, 7 Drawing Sheets

(56) References Cited

U.S. PATENT DOCUMENTS

| | | | | |
|---|---|---|---|---|
| 2019/0086291 | A1* | 3/2019 | Frewen | ................. G07C 5/006 |
| 2019/0107815 | A1 | 4/2019 | Miller et al. | |
| 2020/0074411 | A1* | 3/2020 | Hughes | ................. G06Q 10/06 |
| 2020/0160280 | A1 | 5/2020 | Mojtahedzadeh et al. | |
| 2023/0278727 | A1* | 9/2023 | Morales | .................. G05D 1/12 |

OTHER PUBLICATIONS

Monakhov, Gregory, "Model Analysis: Airlines Fleet", Anylogic Resources Blog, Jul. 30, 2018. (Year: 2018).*
Silva, C., Andrade, P., Ribeiro, B. et al. Adaptive reinforcement learning for task scheduling in aircraft maintenance. Sci Rep 13, 16605 (Published Oct. 3, 2023). https://doi.org/10.1038/s41598-023-41169-3 (Year: 2023).*

* cited by examiner

300

PLANNED MX MODEL 302

SCHEDULED
MX EVENT
304

MX REQ'D
FOR NEXT
ROUTE?
306

—NO→

VEHICLE
AT MX HUB
BEFORE
REQ'D MX?
308

—YES→

YES

NO

RESOURCES
CURRENTLY
AVAILABLE?
310

—NO→

DETERMINE
DELAY TIME
314

YES

DETERMINE
MX TIME
312

MX EFFECT
140

ROUTE
SIMULATION
110

OPERATIONAL SIMULATIONS OF PLANNED MAINTENANCE FOR VEHICLES

FIELD

This invention is directed to the field of operational simulations and, more specifically, determining effects of simulated performances of planned maintenance.

BACKGROUND

Route scheduling is a logistics exercise in which arrival times and departure times are scheduled for a plurality of vehicles for a plurality of routes. The scheduling itself is a simple organizational task. However, with the introduction of planned maintenance, efficient route scheduling becomes a more complex challenge. For example, regular maintenance may need to be performed for a vehicle within a given amount of operating time and/or distance traveled before said vehicle can continue operating along the routes. Naively scheduling such planned maintenance may result in inefficient routes and/or consistent delays in real scenarios. Planned maintenance may not always be performed as scheduled due to various factors, such as variable task times for performing maintenance, availability of resources, etc.

SUMMARY

Implementations for operational simulations of planned maintenance effects for a plurality of vehicles are provided. One aspect provides a computing system comprising processing circuitry configured to provide a plurality of operational models that comprises a route model, a preparation model, and a planned maintenance model. The processing circuitry is further configured to, using the plurality of operational models, execute an operational simulation that generates interactions between a route simulation and a planned maintenance simulation for a plurality of routes in a route schedule, wherein executing the operational simulation comprises simulating performance of a scheduled maintenance task for a vehicle of the plurality of vehicles and determining an effect of the simulated performance of the scheduled maintenance task on the route simulation. The processing circuitry is further configured to output the determined effect of the simulated performance.

BRIEF DESCRIPTION OF THE DRAWINGS

FIG. 4 shows a flow diagram of an example process flow for scheduling maintenance events and tasks, which can be implemented using the example computing system of FIG. 1.

DETAILED DESCRIPTION

Figure 1:
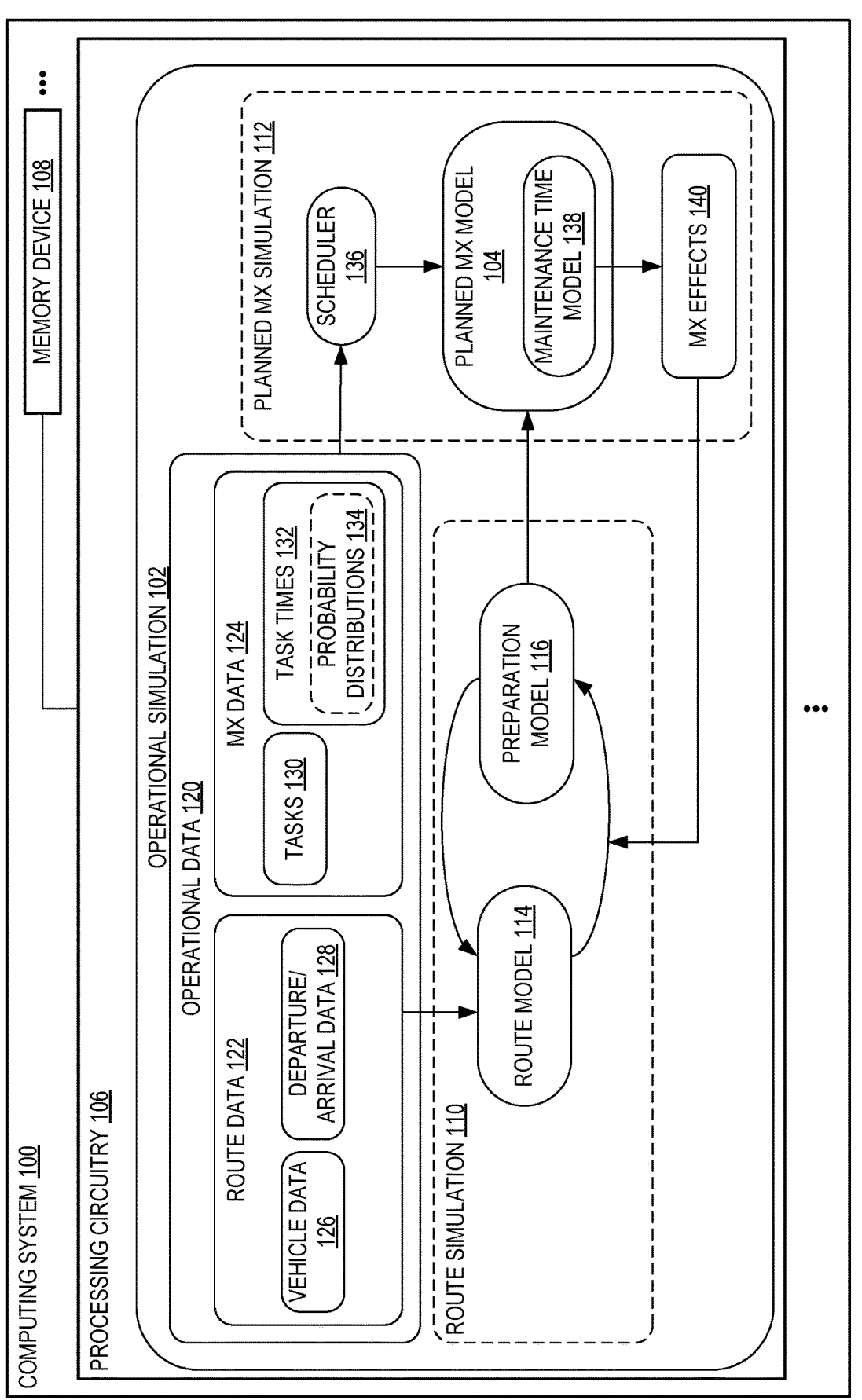
FIG. 1 shows an example computing system for performing an operational simulation for a plurality of routes using a planned maintenance model.

Route scheduling for a fleet of vehicles is a complex logistics operation involving a large number of components. For example, scheduling routes for aircraft operation can involve commercial service scheduling, planned maintenance scheduling, location of maintenance resources, maintenance facility capabilities, etc. Poor maintenance scheduling, including planned maintenance scheduling (or the absence of planned maintenance scheduling), may result in non-optimized, inefficient route schedules and/or changes to said route schedules during operation. Changes in routes or delays can result in adding unanticipated distances and/or operation cycles, which can affect when maintenance is due. These cyclical and consequential effects make route and maintenance scheduling a non-trivial problem.

One aspect of maintenance scheduling affecting route schedules includes the logistics of resource availability for performing maintenance. For example, a vehicle that is overdue for maintenance (e.g., maintenance for a part that has been operating past its maintenance cycle) and is arriving at a station where said maintenance cannot be performed (e.g., due to lack or maintenance equipment and/or certified maintainers) can result in the vehicle being inoperable and unable to continue its route schedule. This inoperable period can last until the operating entity receives a waiver from the appropriate authorities (depending on the type of operation) or until required resources for performing the maintenance, such as certified maintainers, maintenance equipment, parts, etc., are transported to the station at which the vehicle is currently located.

Another aspect of maintenance scheduling affecting route schedules includes variability in the performance of various tasks and the operation of the routes. For example, times for performing maintenance tasks can vary according to several factors, such as unavailability of maintenance stations and maintenance resources. Naïve scheduling processes for route schedules that do not take into account these variations may result in unexpected delays affecting the operation of routes. For example, scheduling preparation time in between routes to include just enough time for performing planned maintenance might often result in delays (due to possibilities of being unable to perform the planned maintenance), which can be propagated along routes and cause further delays—e.g., a delay in arrival time of a first route can result in a delay in departure time of the subsequent route, which can further cause a delay in the arrival time of the subsequent route. Scheduling preparation time to include abundant time for planned maintenance may result in inefficient route scheduling. For example, a commercial route schedule that could have included more routes would be more economically inefficient.

In view of the issues described above, systems and methods for simulating operational impact of planned maintenance are provided. The disclosure provided herein describes processes and models for the operational simulation of a vehicle route schedule. Such processes and models can be implemented for any type of vehicles operating a route schedule, including but not limited to cars, buses, and aircraft. Simulating the operational impact of planned maintenance can be performed by performing an operational simulation that includes a route simulation and a planned maintenance simulation. The route simulation simulates the operation of a route schedule where vehicles transit from station to station. The planned maintenance simulation simulates the performance of planned maintenance on the vehicles. Interactions of different variables between the route simulation and the planned maintenance simulation can be analyzed to determine the effects of planned maintenance on the route simulation. For example, the time it takes to perform a given maintenance task may vary, sometimes taking longer than expected. The operational simulation can be performed as a probabilistic simulation that simulates these variables to provide assessments on expected effects of planned maintenance on a route schedule.

Turning now to the drawings, systems and methods for simulating operational impact of planned maintenance are illustrated and described. FIG. 1 shows an example computing system 100 for performing an operational simulation 102 for a plurality of routes using a planned maintenance model 104. The example computing system 100 includes processing circuitry 106 (e.g., a logic processor such as a central processing unit (CPU)) and a memory device 108 (e.g., volatile and non-volatile memory) operatively coupled to each other. Other components such as input/output subsystems (not shown) can also be included. The memory device 108 stores instructions that, upon execution by the processing circuitry 106, cause the processing circuitry 106 to perform the operational simulation 102. Additional details regarding processing device 106, memory device 108, and other components, subsystems, and algorithms of computing system 100 are described further below with reference to FIG. 7.

The operational simulation 102 includes performing a route simulation 110 and a planned maintenance simulation 112 using a plurality of operational models to model a plurality of vehicles operating along a plurality of routes. In some implementations, the plurality of operational models includes a probabilistic model that simulates uncertainty of various events, such as task times for performing preparation tasks and maintenance tasks. In the depicted example, the plurality of operational models includes a route model 114, a preparation model 116, and a planned maintenance model 104. Different configurations and types of operational models can also be implemented. For example, additional models can be utilized to increase fidelity of the operational analysis. In some implementations, the operational simulation 102 includes an unplanned maintenance model for simulating unexpected maintenance due to faults occurring in the vehicles operating along the routes.

Operational data 120 containing data/information used by the plurality of models are provided. For example, the operational data 120 provided in the depicted example includes route data 122 and maintenance data 124. Different or additional types of data may also be included in the operational data 120. For example, more detailed data regarding preparation time in between a vehicle's arrival and departure can be provided to increase fidelity of the operational simulation. The route data 122 includes information describing a route schedule that includes a plurality of routes on which the operational simulation can be performed. The route schedule can be defined using vehicle data 126, which describes a plurality of vehicles (e.g., identification numbers and designations), and departure/arrival data 128, which describes departure and arrival times at transit stations associated with the plurality of vehicles described in the vehicle data 126. Additional information can be provided in the route data 122. In some implementations, the route data 122 includes a list of stations and various properties describing each station. For example, the route data 122 can include the maintenance capabilities of each station. In a further example, maintenance capabilities can be described with respect to the type and model of the vehicle—e.g., a station may have different maintenance capabilities for different vehicle models.

The maintenance data 124 includes a list of tasks 130, with each task 130 describing a maintenance task that can be performed on a vehicle from the vehicle data 126. The maintenance data 126 further includes task times 132 that describe the amount of time for performing a respective task. Additional information can be provided in the maintenance data 124. For example, resources for performing each maintenance task 130 can be provided. In some implementations, the maintenance data 124 provides a list of stations capable of performing a respective maintenance task 130. The task time 132 for a maintenance task 130 can be simulated in the operational simulation 102 using discrete or probabilistic methods. In the depicted example, the task times 132 are associated with probability distributions 134 that describes the likelihood and the amount of time it takes to perform a respective maintenance task 130.

The probability distributions 134 can be any statistical distribution that represents the spread of task time data. Examples can include but are not limited to a log-normal distribution, a triangle distribution, etc. The type of statistical distribution utilized can depend on the application. In some implementations, the statistical distribution is constrained to not generate negative values. In another example, one or more of the probability distributions 134 can include a triangle distribution with appropriate parameters to prevent simulating a negative task time. In some implementations, one or more of the probability distributions 134 are asymmetric distributions which can reflect certain known aspects of the related tasks (e.g., a task can be modeled to have a minimum task time, a non-negative task time, etc.). Parameters of the probability distribution (e.g., mean, standard deviation, etc.) can be predetermined. In some implementations, the parameters are determined using historical data, including real-world data and/or historical simulated data. The parameters can be updated (including in real-time during the simulation) to reflect any changes in the data. In some implementations, the task time is dependent on various conditions (e.g., type of vehicle, current transit location, available resources, etc.). For example, the discrete time it takes to perform a maintenance task and/or the probability distribution for the performing the maintenance task can depend on the type of vehicle on which the maintenance task is performed. During the operational simulation, the probability distributions 134 may be used to perform a probabilistic drawing to simulate the task time for performing a given maintenance task. In some implementations, simulating the time for performing a given maintenance task can be affected by various factors, such as the maintenance resources associated with the maintenance task and the maintenance capabilities of the current transit station.

Performance of the route simulation 110 includes the use of the route model 114 and the preparation model 116. The route simulation 110 simulates performance of a route schedule derived from the route data 122. The route schedule may be described in various ways. For example, a route schedule can be defined with a plurality of routes on which a plurality of vehicles (e.g., cars, buses, aircraft, etc.) operates. A route can be defined in various ways. In some implementations, a route includes information describing a departure time from a first transit location, an arrival time at a second transit location, and an identification of a vehicle operating on the route. A route can also include other information. For example, in an operational simulation for a fleet of aircraft, a route can include information describing the flight path from a first airport to a second airport (including departure and arrival times), flight phases, flight altitudes, taxi/tow times, etc.

The preparation model 116 describes and simulates tasks to prepare a vehicle for departure and to be performed within a preparation time period—i.e., the time period between the arrival time of a vehicle at a transit station and the departure time of the vehicle for its subsequent route. For example, in an aircraft route simulation, the preparation time period is the ground time of an aircraft between routes (i.e., the time period between landing and take-off for the subsequent route). In further examples, the preparation model 116 for an aircraft route simulation includes taxi/tow models. Example tasks to be performed within the preparation time period include the arrival of the vehicle, the inspection of the vehicle (e.g., for faults), and the performance of maintenance (e.g., planned and/or unplanned maintenance), if any, on the vehicle. Other example tasks can include cleaning and refueling the vehicle. As can readily be appreciated, the type of tasks simulated can depend on the application. In an aircraft route simulation, the preparation model can be described as a ground model that includes tasks such as passenger deplaning/boarding, the unloading/loading of bags, aircraft taxiing, etc.

The preparation model 116 can model and simulate tasks using discrete and/or probabilistic methods. For example, the task time of a given task within the preparation model can be simulated to take N minutes. Alternatively, the task time can be simulated using a probability distribution (e.g., a normal distribution). Parameters of the probability distribution (e.g., mean, standard deviation, etc.) can be predetermined based on real-world data. The parameters can be updated to reflect any changes in the real-world data. In some implementations, the task time is dependent on various conditions (e.g., type of vehicle, current transit station, available resources, etc.). For example, the preparation model 116 can simulate the task time of a given task differently for different vehicles (e.g., different vehicle models may have different refueling times). As another example, the arrival time can be simulated to have a different probability distribution for different transit stations (e.g., certain transit stations may have more late arrivals statistically due to weather, traffic congestion, etc.). The task time can also be based on a conditional dependency. In some implementations, simulation of a task time for a given task can depend on the occurrence/non-occurrence of an event. For example, a vehicle arriving late to a transit station (e.g., due to delays caused by maintenance) can affect the task time of the refueling step (e.g., additional wait time on resources needed for the refueling step). The various dependencies described above can be implemented in both discrete and probabilistic simulations.

The planned maintenance simulation 112 can be performed to simulate the effects of planned maintenance on the route simulation 110. In the depicted example, the planned maintenance simulation 112 utilizes a schedule of planned maintenance tasks generated by a scheduler 136 using the operational data 120. For example, given the list of vehicles from the vehicle data 126, the scheduler 136 generates a list of maintenance tasks. Each maintenance task to be performed is associated with a vehicle and can include a time/time period in which to perform the maintenance task. For example, a given maintenance task may need to be performed on a given vehicle at predetermined intervals (or upon occurrence of an event) so that the vehicle can continue operating. The time/time period for performing the given maintenance task can be described in total time, operating time, or number of transits/flights. In some implementations, a vehicle that is unable to have a maintenance task performed in the requisite time period is prevented from continuing operation of its routes. Different types of vehicles and vehicle models may have different maintenance requirements with respect to the type of maintenance task to be performed and the time period for performing said task before the vehicle is inoperable (e.g., newer vehicles may operate longer before a given maintenance task is required to be performed for continued operation).

The schedule of planned maintenance tasks is utilized by the planned maintenance model 104 for simulation of the performance of the planned maintenance tasks. Maintenance time for performing each planned maintenance task is simulated using a maintenance time model 138. Maintenance time can include task time, which is the time it takes for performing the planned maintenance task, and delay time, which is the added time it takes for performing maintenance due to lack of maintenance resources. For example, a busy maintenance station may result in a wait time. Lack of maintenance resources such as labor resources, parts resources, etc. can all affect the delay time. In some implementations, the delay time includes the task time for performing an additional maintenance task. Such scenarios can occur due to the unavailability of a maintenance station (with the appropriate maintenance resources) for performing the additional maintenance task along a vehicle's routes before the required time for performing the additional maintenance task has passed. In some implementations, the maintenance time includes miscellaneous time arising due to various reasons. For example, the maintenance time can include delay time due to certain findings during performance of the maintenance task (e.g., discovery of additional maintenance to be performed while performing the original maintenance task).

The maintenance time model 138 utilizes information from various sources to determine maintenance time. For example, the maintenance time model 138 can utilize the task times 132 and/or associated probability distributions 134 in the maintenance data 124 to simulate task times for performing the scheduled planned maintenance tasks. As described above, each task time can be simulated in a discrete or probabilistic manner (e.g., a given planned maintenance task may take N minutes to be performed or a probabilistic drawing can be performed using a probability distribution with predetermined mean and standard deviation). Other factors, such as resource availability, can also affect the simulated task time. For example, different maintenance stations may have different capabilities and may perform the maintenance task quicker or slower than another station. The maintenance time can include delay time, which can be incurred for various reasons and simulated using similar methods as the simulation of task times. Examples of such include a busy maintenance station where the vehicle needs to wait for resource availability to perform the planned maintenance. In some implementations, the delay time is simulated based on available resources at the current station.

The planned maintenance simulation 112 utilizes the determined maintenance time from the maintenance time model 138 to determine the effects 140 of performing the maintenance task. The effects 140 of performing the maintenance task can be determined in various ways. Information from the preparation model 116 can provide context that can determine the impact, if any, that the maintenance time has on the route schedule. For example, the preparation model 116 can provide schedule slack information, which describes the slack time, if any, between routes for a given vehicle. Slack time is a period of time within the preparation time period that provides a buffer in which tasks can be performed without affecting the departure time of the subsequent route. For example, slack time can include scheduled time in the route schedule intended for providing a buffer period for any delayed route to "catch up." Slack time can also include any extra time provided due to early completion of preparation tasks—e.g., early simulated arrival times. As such, in some cases, the route schedule may be unaffected by planned maintenance that includes delay time. As another example, the arrival time simulated in the preparation model 116 can affect whether the planned maintenance time causes a delay for the next route in the route schedule. An arrival time later than expected may have less time for performing maintenance without incurring a delay in the route schedule.

The determined effects 140 can be utilized in various ways. In some implementations, the effects 140 are output for analysis. The depicted example of FIG. 1 shows the effects 140 being used to alter the route simulation 110. For example, altering the route simulation can include altering a departure time of a route or the destination station of a route. Excessive delay times can cause a later departure time, which can cause a delay in arrival time at the next station. Delays in one route may cause a delay in a subsequent route by the same vehicle. This effect can cascade and cause delays and route alterations for more than one subsequent route. For example, an unavailable maintenance hangar or any other maintenance resource for performing a required scheduled maintenance can result in a waiting period that causes a delay. The delay can result in the vehicle not being able to depart at its scheduled departure time for its subsequent route. In such cases, the route schedule can be updated to reflect the delay in the departure time, which can cascade and affect subsequent routes. As described above, slack time can provide a buffer period in which delayed routes can "catch up." As such, the cascading effects do not necessarily propagate throughout the entire route schedule. By simulating these events using probabilistic models, operational simulations performed by the example system 100 of FIG. 1 enable assessment of the operational impact of planned maintenance events that takes into account various dynamic components in the operation of a route schedule.

FIG. 1 shows a general implementation for performing an operational simulation. Various models can be included to improve utilization and/or fidelity of the simulation. For example, an unplanned maintenance model can be included in the system of FIG. 1 to simulate and model the combined effects of planned and unplanned maintenance, which can provide various useful information such as but not limited to parts reliability (e.g., examining the effects of more expensive, reliable parts that require less but longer maintenance versus more inexpensive parts that are more unreliable). Another example model that can be employed includes a delay cost model, which can examine the cost impacts of the various aspects described above.

Figure 2:
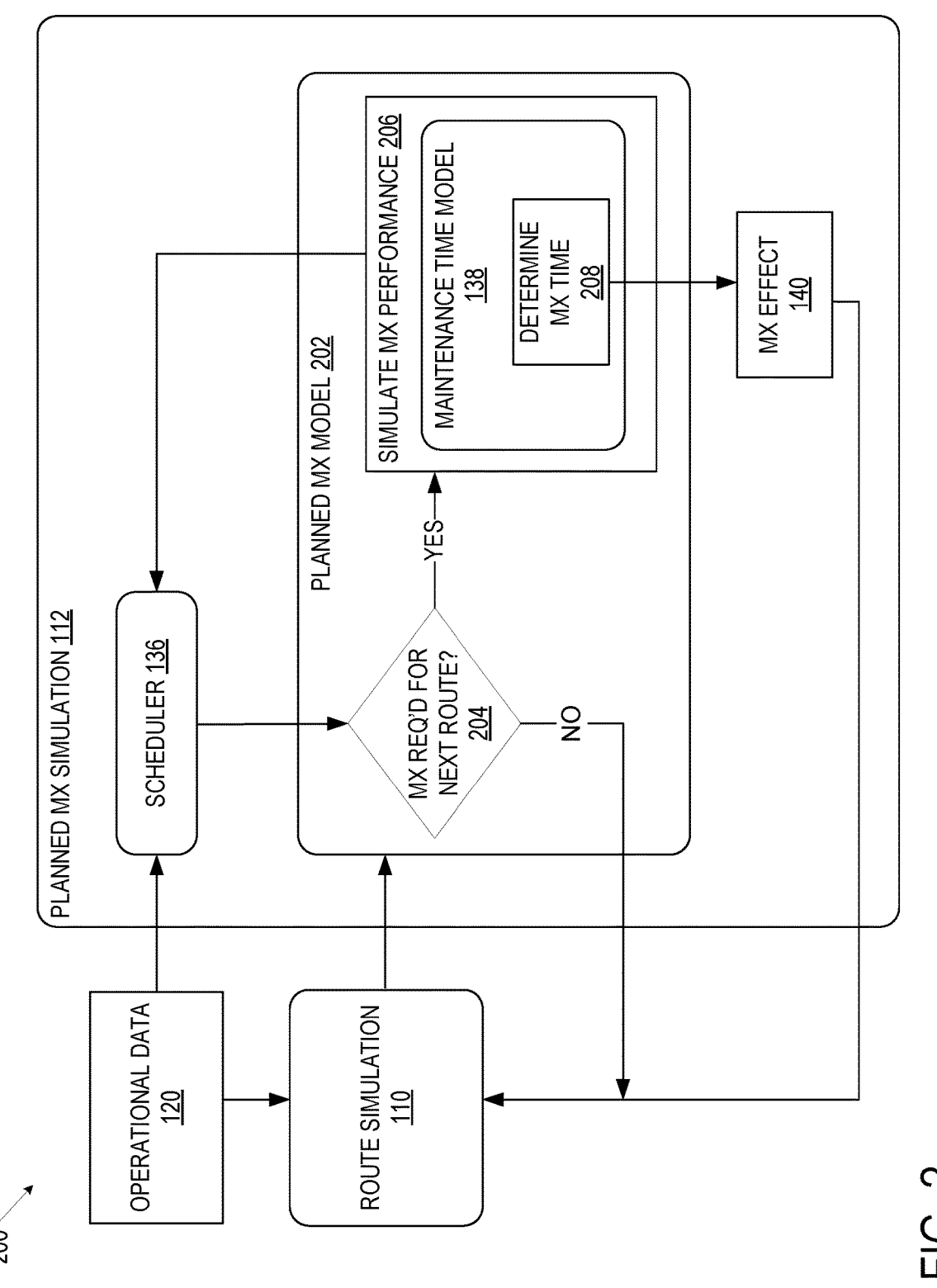
FIG. 2 shows a flow diagram of an example process flow for simulating planned maintenance events using a planned maintenance model, which can be implemented using the example computing system of FIG. 1.

FIG. 2 shows a flow diagram of an example process flow 200 for simulating planned maintenance events using a planned maintenance model 202. The example process flow 200 depicts a flow of events that illustrates interactions between a route simulation 110 and a planned maintenance simulation 112, similar to that as shown in FIG. 1. The process flow 200 depicted in the planned maintenance simulation 112 includes a scheduler 136 that uses operational data 120 to generate a schedule of a plurality of planned maintenance events to be performed. In other implementations, the planned maintenance simulation 112 does not include a scheduler. The schedule of planned maintenance events is provided to the planned maintenance model 202 to be simulated. Simulation of scheduled maintenance events can be performed in various ways. Scheduled maintenance events can occur as scheduled but may also be delayed for various reasons.

At step 204 of the example process flow 200, the planned maintenance simulation 112 determines if a scheduled maintenance event is required for the vehicle to operate its next route. If a scheduled maintenance event is not required for the vehicle to operate its next route, the scheduled maintenance event can be deferred to be performed at a subsequent maintenance station along a vehicle's route schedule. In such cases, the route simulation 110 continues to operate without alteration. If the maintenance event is required for the vehicle to continue operating for its next route, performance of the maintenance event is simulated 206. Simulating the performance of the maintenance event includes use of a maintenance time model 138, such as the one described in FIG. 1, to determine 208 a maintenance time. As described above, maintenance time can be defined in various ways. In some implementations, maintenance time includes a task time and a delay time. Using the determined maintenance time and the route information from the route simulation 110, one or more maintenance effects 140 can be determined. For example, a maintenance time that is longer than expected or scheduled in a given route schedule can result in a delay of a departure time for the vehicle's next route. The maintenance effect 140 is fed into the route simulation 110 to alter, if needed, the route schedule. For example, altering the route schedule can include altering a departure time of a route or the destination station of a route.

The scheduler 136 can be implemented in various ways. For example, the scheduler 136 can be configured to generate a schedule of planned maintenance events for a plurality of vehicles identified in the operational data 120. The process for generating the schedule of planned maintenance events can occur at various points in the planned maintenance simulation 112. Generally, the scheduler 136 generates the schedule of planned maintenance events at the start of the operational simulation. In other implementations, the planned maintenance simulation 112 does not include a scheduler. For example, a schedule of planned maintenance events can be manually imported into the system performing the operational simulation. The scheduler 136 can be configured to reschedule the planned maintenance events after a predetermined event. For example, as the operational simulation progresses, changes in routes may occur, which can affect the schedule of planned maintenance events (e.g., the vehicle is no longer arriving at the station at which a planned maintenance event was originally scheduled). In such cases, the scheduler 136 can automatically reschedule the planned maintenance events accordingly. In the depicted example process flow 200, after simulating the performance of a maintenance event 206, the scheduler 136 can reschedule the planned maintenance events to update and reflect any changes to be made in the schedule. In some implementations, the scheduler 136 reschedules the planned maintenance events after a predetermined time period (e.g., every N number of days).

Figure 3:
FIG. 3 shows a flow diagram of an example process flow for a planned maintenance model, which can be implemented using the example computing system of FIG. 1.

FIG. 2 illustrates an example process flow for implementing a planned maintenance simulation. Other variations/algorithms or further components for additional complexity can also be employed for performing planned maintenance simulation. For example, various different algorithms can be implemented for determining whether maintenance is required. FIG. 3 shows a flow diagram of an example process flow 300 for a planned maintenance model 302. The example process flow 300 depicts a flow of events for a given scheduled maintenance event 304 and the interactions between a route simulation 110 and the planned maintenance model 302, which can be implemented in a planned maintenance simulation (such as the one depicted in FIGS. 1 and 2). Furthermore, the planned maintenance model 302 can be implemented similarly as the planned maintenance models 104, 202 described in FIGS. 1 and 2.

Starting with the scheduled maintenance event 304, step 306 of the example process flow 300 determines whether the scheduled maintenance event 304 is required to be performed before the vehicle associated with the scheduled maintenance event 304 can continue to operate along its routes. If the scheduled maintenance event 304 is not required, a determination is performed at step 308 to determine whether the vehicle will be at a maintenance station/hub with the maintenance resources to perform the scheduled maintenance event 304 before said maintenance event 304 is required for continued operation. If the vehicle will be at a maintenance station along its future routes that is capable of performing the scheduled maintenance event 304 before it is required, performance of the scheduled maintenance event 304 can be deferred to a later maintenance station along its routes. In some implementations, the location of a subsequent maintenance station to perform the scheduled maintenance event/task is determined. The location of the maintenance station to perform the scheduled maintenance can be determined in various ways. In some implementations, a list of candidate maintenance stations is determined, and performance of the scheduled maintenance event 304 is deferred to a candidate from the list. The route simulation 110 then continues without any additional alteration. If either the scheduled maintenance event 304 is currently required or the vehicle will not be at an appropriate maintenance station in time, the scheduled maintenance event 304 is to be performed at the current station.

A determination is made at step 310 of whether maintenance resources are currently available at the current station for performing the scheduled maintenance event 304. If resources are available, maintenance time for performing the scheduled maintenance event 304 is determined 312. If resources are not available, a delay time is determined 314 and is included in the determination 312 of the maintenance time for performing the scheduled maintenance event 304. In addition to determining whether there is a delay time, determination of the maintenance time includes determining the task time of performing the scheduled maintenance event 304. As described in the sections above, the task time for performing a maintenance event can be simulated using discrete or probabilistic methods.

The determined maintenance time is then used to determine a maintenance effect 140 on the route schedule, which is used to determine an alteration, if any, in the route schedule and its simulation 110. For example, a maintenance effect 140 can include a delay in departure time of the next route for the vehicle on which the scheduled maintenance event 304 is performed. In some implementations, the maintenance effect 140 has no effect on the route schedule. Such cases can occur in several scenarios. A route schedule that includes preparation time for performing the scheduled maintenance event 304 can, as expected, perform the scheduled maintenance event 304 without any delay if maintenance resources are available. In some cases, the route schedule includes preparation time in between routes that has additional schedule slack. Delays that are lower than the schedule slack amount can also result in the route schedule being unaffected by performance of the scheduled maintenance event 304, even in the event of additional delay time.

Figure 4:
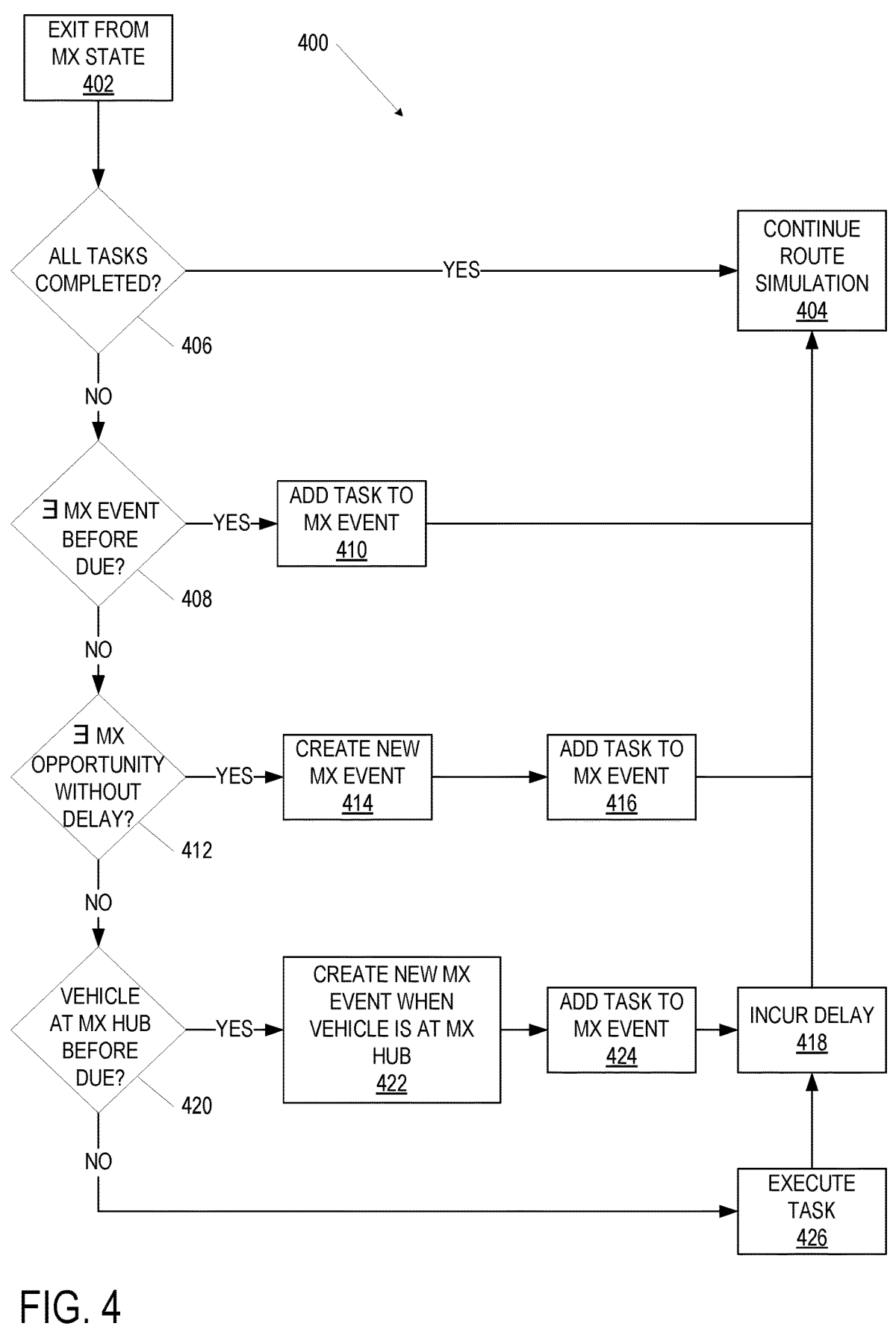

FIG. 4 shows a flow diagram of an example process flow 400 for scheduling maintenance events and tasks. A maintenance event can be described and implemented in operational simulations in various ways. In some implementations, a maintenance event includes a set of maintenance tasks to be performed on a vehicle. The maintenance event can also specify the order in which the maintenance tasks are to be performed (e.g., based on when the maintenance task is due, resource availability, etc.). The example process flow 400 illustrates a decision tree upon exit 402 from a maintenance state and determines steps, if any, that need to be taken before simulation 404 of the route schedule is continued. Exit 402 from a maintenance state can occur in several scenarios. For example, the operational simulation can exit a maintenance state upon performance of all the maintenance tasks of a maintenance event. Exit 402 from a maintenance state can also occur upon a predetermined elapsed time period (e.g., preparation time scheduled for performing maintenance). The process flow 400 includes, at step 406, determining whether all maintenance tasks scheduled for the given vehicle have been completed. If so, simulation 404 of the route schedule is continued without any unexpected alteration. If all maintenance tasks have not been completed, the decision process continues at step 408.

At step 408, a determination is made of whether there exists a maintenance event before the uncompleted maintenance task(s) are due or required before the vehicle can continue to operate. If there exists such a maintenance event, the uncompleted task(s) are added 410 to the maintenance event, and simulation 404 of the route schedule is continued. If there does not exist such an event, the process flow 400 continues at step 412, and a determination is made of whether there exists an opportunity to perform a maintenance event without incurring additional delay. For example, a vehicle may have extra slack time or extra time scheduled for performing maintenance in its subsequent routes before the uncompleted maintenance task is due. If so, a new maintenance event is created/scheduled 414. The uncompleted maintenance task(s) to be performed are added 416 to the new maintenance event, and simulation 404 of the route schedule is continued. If there does not exist such an opportunity, a delay will likely be incurred.

At step 420, a determination is made of whether the vehicle will be at a maintenance station/hub before the uncompleted maintenance task(s) are due. If the vehicle will be at such a station along its subsequent routes, a new maintenance event is created 422 when the vehicle is at said station. The uncompleted maintenance task(s) are added 424 to the new maintenance event. Such a scenario incurs 418 a delay since step 412 has determined that no opportunity for performing a maintenance event without incurring additional delay exists. For example, the station may already be saturated with scheduled maintenance for other vehicles, and performance of the uncompleted maintenance task(s) may incur an additional waiting period. If the vehicle will not be at a maintenance station before the uncompleted maintenance task(s) are due, then the uncompleted maintenance task(s) are to be performed/executed 426 at the current station. The delay is calculated and incurred 418, and simulation 404 of the route schedule is continued.

Figure 5:
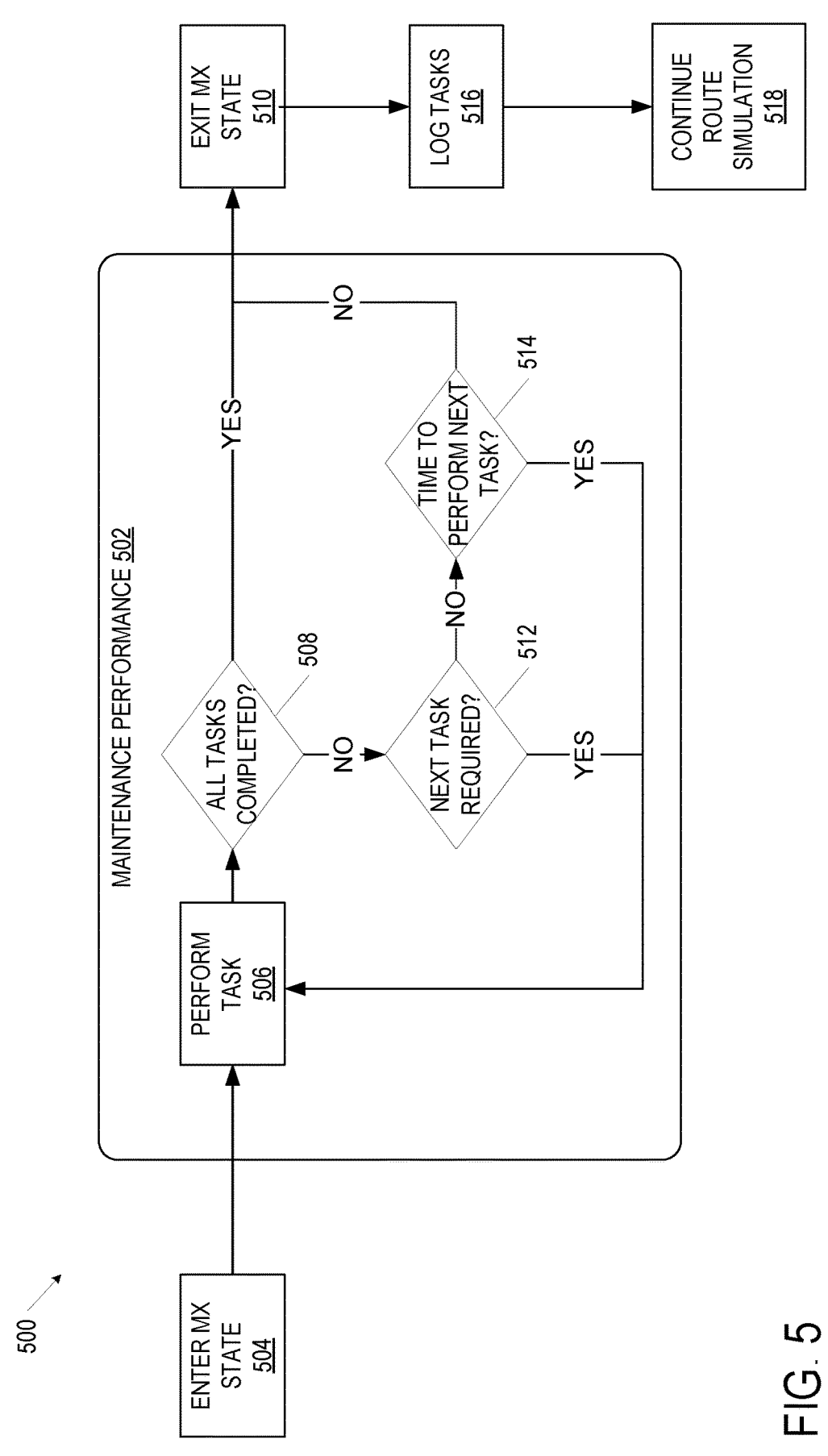
FIG. 5 shows a flow diagram of an example process flow for performing maintenance on a vehicle, which can be implemented using the example computing system of FIG. 1.

FIG. 5 shows a flow diagram of an example process flow 500 for performing maintenance on a vehicle. The example process flow 500 depicts a decision tree that illustrates performance of a maintenance event 502. Performance of a maintenance event starts with entering 504 a maintenance state. A maintenance state can be entered in the operational simulation upon determination that performance of maintenance is to be simulated. For example, in FIG. 2, the process can enter a maintenance state upon determination 204 that the scheduled maintenance is required for operation of the vehicle for the next route.

Referring back to FIG. 5, performance of the maintenance event 502 includes performing a maintenance task 506. The maintenance task to be performed can be determined in various ways. In some implementations, the maintenance event includes a priority list of maintenance tasks to be performed, and the maintenance tasks are performed in order in accordance with their priority (as long as the appropriate maintenance resources are available). For example, a maintenance event can list maintenance tasks in order of when the tasks are due or required for the vehicle to continue operating. In some implementations, the maintenance tasks are ordered using information regarding other maintenance events such that maintenance resources are efficiently utilized across all maintenance events for the plurality of vehicles (e.g., providing a high utilization rate for the maintenance resources).

After completion of a maintenance task, a determination is made at step 508 of whether all tasks are completed. If all tasks of the maintenance event are completed, performance of the maintenance event 502 is completed and the process flow 500 exits the maintenance state 510. If all tasks are not completed, a determination is made at step 512 of whether the next task in the maintenance event is required. If the next task is not required, a determination is made at step 514 of whether there is time to perform the task. For example, a route schedule may be defined with preparation time that includes a predetermined and allocated time period for performing maintenance. If performance of tasks in the maintenance event exceeds the allocated time period, then performance of the maintenance event 502 can be exited if the next or remaining task(s) in the maintenance event is not required for the vehicle to continue operating its route schedule.

If there exists enough time to perform the next task or if the next task is required for the vehicle to continue operating, the process flow returns to step 506 where the next task is performed. As can readily be appreciated, performance of additional tasks may result in delays (not shown), which can depend on various factors including the allocated time for performing maintenance. Upon exit from the maintenance state 510, the completed and uncompleted tasks are logged 516 accordingly. Uncompleted task information can be used to schedule uncompleted tasks in subsequent operation of the route schedule (e.g., using the process flow depicted in FIG. 4). The process flow 500 then continues with simulation of the route schedule 518.

Figure 6:
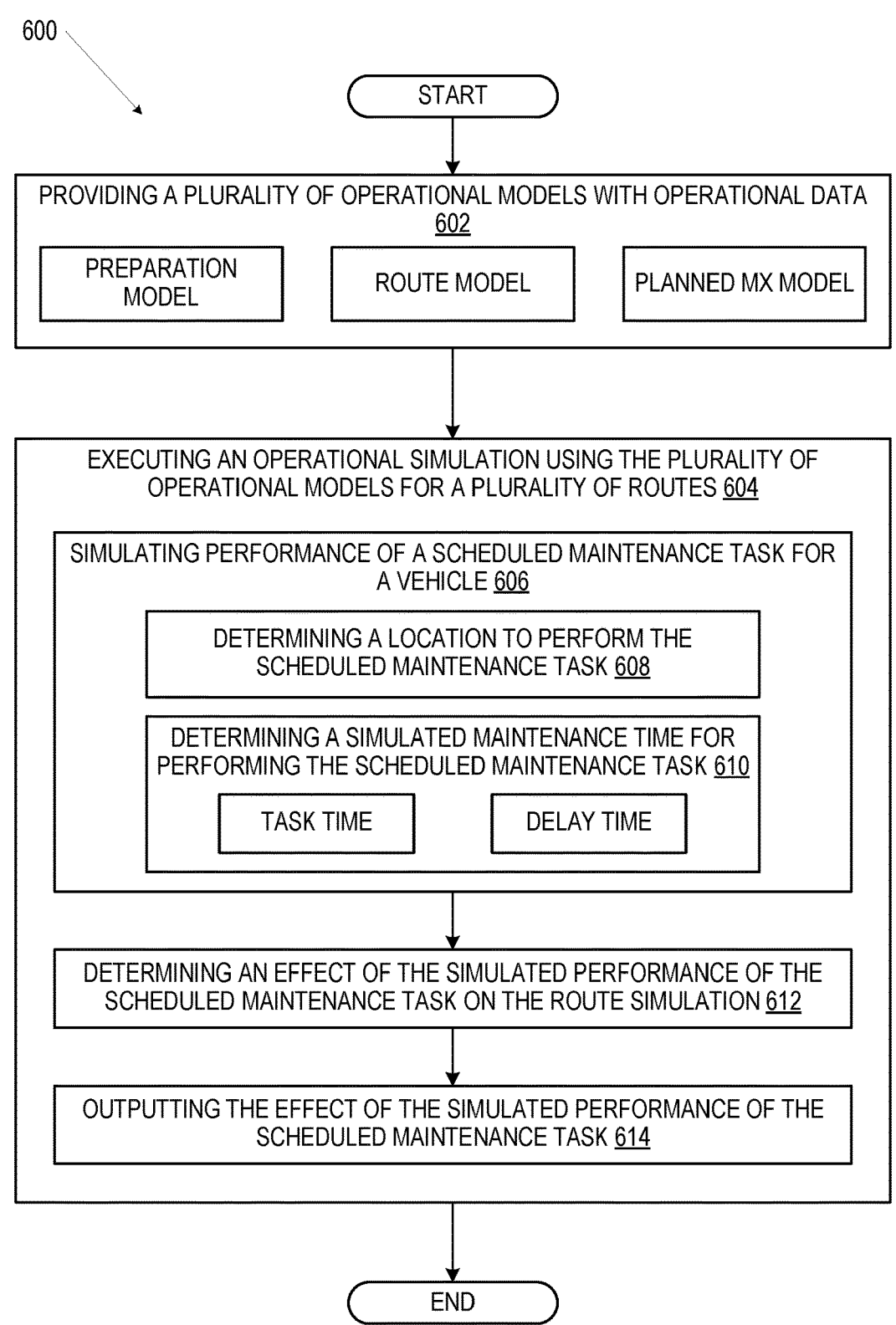
FIG. 6 shows a flow diagram of an example method for simulating operational impact of planned maintenance using a planned maintenance model, which can be implemented using the example computing system of FIG. 1.

FIG. 6 shows a flow diagram of an example method 600 for performing an operational simulation for a plurality of routes using a planned maintenance model. The example method 600 describes processes for the operational simulation of a vehicle route schedule. Such processes can be implemented for any types of vehicles operating a route schedule, including but not limited to cars, buses, and aircraft.

At step 602, the method 600 includes providing a plurality of operational models. Various types of operational models can be utilized. Examples of operational models include but are not limited to a preparation model, a route model, and a planned maintenance model as described herein. Operational data for use by the operational models can also be provided. Different types of operational data can be provided depending on the operational models utilized. For example, the operational data can include information describing a route schedule for a plurality of vehicles, information describing tasks to prepare a vehicle for departure, and/or information describing a plurality of maintenance tasks, each maintenance task associated with information describing a task time. Task times can be described and implemented by the operational simulation using discrete and/or probabilistic methods. In some implementations, the information describing the task times includes a probability distribution of task time for each maintenance task.

At step 604, the method 600 includes executing an operational simulation using the plurality of operational models. As described above, the method 600 can include providing operational data that includes information describing a route schedule for a plurality of vehicles. The operational simulation can be performed for a plurality of routes of the route schedule, each of which is associated with a vehicle. Performing the operational simulation can include performing a route simulation and a planned maintenance simulation and analyzing the interactions generated by the two simulations.

Executing the operational simulation includes, at substep 606, simulating performance of a scheduled maintenance task for a vehicle. In some implementations, the scheduled maintenance task is provided by a scheduler that schedules a plurality of scheduled maintenance tasks for the plurality of vehicles to be simulated in the operational simulation. The scheduler can be configured to provide, at the start of the operational simulation, an initial schedule of maintenance tasks to be performed. In some implementations, the scheduler reschedules the plurality of scheduled maintenance tasks after a predetermined event. For example, the predetermined event may be upon completion of a maintenance task and/or event. In some implementations, the scheduler reschedules the maintenance tasks every N number of days/weeks/months/etc. The scheduler can be configured to reschedule the remaining maintenance tasks and/or additional maintenance tasks to generate a new schedule of maintenance tasks to be performed.

In some implementations and with reference to substep 608, simulating the performance of the scheduled maintenance task includes determining a location to perform the scheduled maintenance task. Determining said location can be performed in various ways. For example, a list of one or more candidate stations along routes of the vehicle associated with scheduled maintenance task can be determined, and a candidate can be selected based on any predetermined criteria. The scheduled maintenance task can then be deferred to the selected candidate station. The list of candidate stations can be determined based on a time after which the scheduled maintenance task is required for the vehicle associated with the scheduled maintenance task to operate in the route simulation. For example, if the scheduled maintenance task needs to be performed before the vehicle transits across stations an N number of times, then the list of candidate stations includes stations with maintenance capabilities along the vehicle's route schedule before the N number of transits.

In some implementations and with reference to substep 610, simulating the performance of the scheduled maintenance task includes determining a simulated maintenance time for performing the scheduled maintenance task. The simulated maintenance time can include simulated task time and simulated delay time. Simulating the task time for the scheduled maintenance task can be performed in various ways. In some implementations, the simulated task time is a discrete amount of time provided by information in the operational data. In other implementations, simulating the task time for the scheduled maintenance task includes simulating a probabilistic drawing of a probability distribution corresponding to the scheduled maintenance task. In such cases, the operational data can include information describing a probability distribution of task time for each maintenance task. Simulating the delay time can be performed in various ways. In some implementations, the simulated delay time is determined based on available resources at a current station of a current route being simulated in the route simulation.

Executing the operational simulation includes, at substep 612, determining an effect of the simulated performance of the scheduled maintenance task on the route simulation. The simulated performance of the scheduled maintenance task can result in a variety of different effects on the route simulation. In some implementations, the determined effect includes no effect on the route simulation. In other implementations, the determined effect includes a delay in departure time of a route (e.g., the subsequent route). Multiple effects can result from and be determined accordingly for the simulated performance of the scheduled maintenance task.

Executing the operational simulation includes, at substep 614, outputting the effect of the simulated performance of the scheduled maintenance task. In some implementations, the effect of the simulated performance of the scheduled maintenance task is utilized to alter the route simulation. In further implementations, altering the route simulation comprises altering a departure time and/or an arrival station of a route of the plurality of routes.

Figure 7:
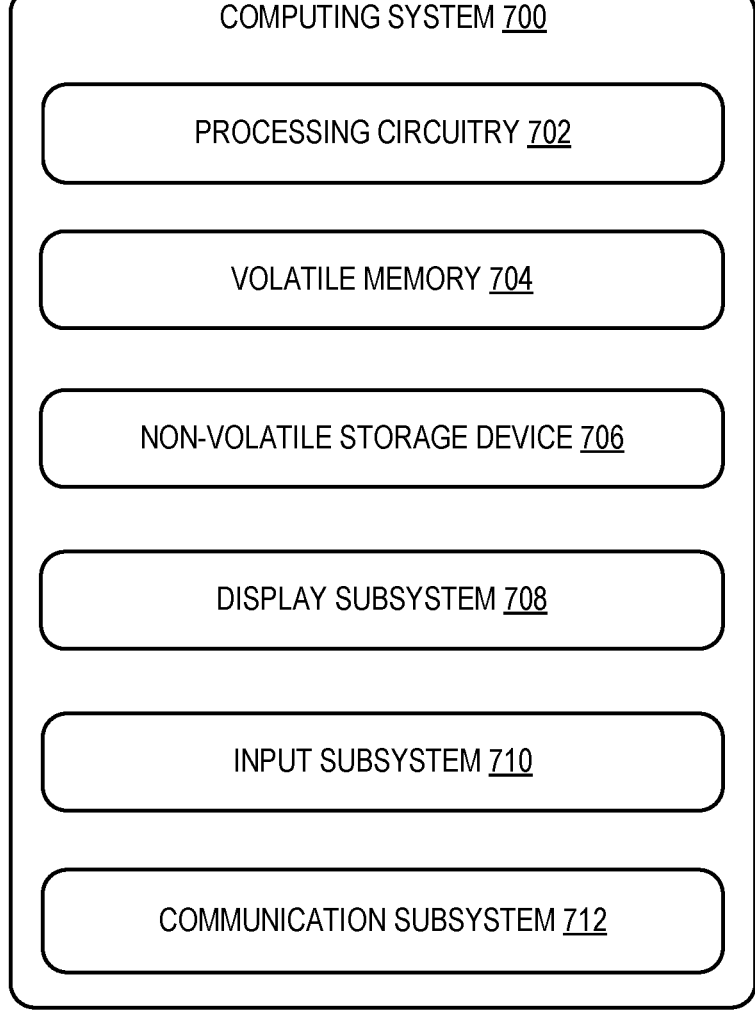
FIG. 7 shows an example computing system in which the computing system of FIG. 1 may be instantiated.

FIG. 7 schematically shows a non-limiting embodiment of a computing system 700 that can enact one or more of the methods and processes described above. Computing system 700 is shown in simplified form. Computing system 700 may embody the computing system 100 described above and illustrated in FIG. 1, respectively. Components of computing system 700 may be included in one or more personal computers, server computers, tablet computers, network computing devices, mobile computing devices, mobile communication devices (e.g., smartphone), and/or other computing devices, and wearable computing devices such as smart wristwatches and head mounted augmented reality devices.

Computing system 700 includes processing circuitry 702, volatile memory 704, and a non-volatile storage device 706. Computing system 700 may optionally include a display subsystem 708, input subsystem 710, communication subsystem 712, and/or other components not shown in FIG. 7.

Processing circuitry 702 typically includes one or more logic processors, which are physical devices configured to execute instructions. For example, the logic processors may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the processing circuitry 702 may be single-core or multi-core, and the instructions executed thereon may be configured for sequential, parallel, and/or distributed processing. Individual components of the processing circuitry optionally may be distributed among two or more separate devices, which may be remotely located and/or configured for coordinated processing. For example, aspects of the computing system disclosed herein may be virtualized and executed by remotely accessible, networked computing devices configured in a cloud-computing configuration. In such a case, these virtualized aspects are run on different physical logic processors of various different machines, it will be understood. These different physical logic processors of the different machines will be understood to be collectively encompassed by processing circuitry 702.

Volatile memory 704 may include physical devices that include random access memory. Volatile memory 704 is typically utilized by processing circuitry 702 to temporarily store information during processing of software instructions. It will be appreciated that volatile memory 704 typically does not continue to store instructions when power is cut to the volatile memory 704.

Non-volatile storage device 706 includes one or more physical devices configured to hold instructions executable by the processing circuitry to implement the methods and processes described herein. When such methods and processes are implemented, the state of non-volatile storage device 706 may be transformed—e.g., to hold different data.

Non-volatile storage device 706 may include physical devices that are removable and/or built in. Non-volatile storage device 706 may include optical memory, semiconductor memory, and/or magnetic memory, or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Aspects of processing circuitry 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via processing circuitry 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a GUI. As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with processing circuitry 702, volatile memory 704, and/or non-volatile storage device 806 in a shared enclosure, or such display devices may be peripheral display devices.

When included, input subsystem 710 may comprise or interface with one or more user-input devices such as a keyboard, mouse, touch screen, camera, or microphone.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 800 to send and/or receive messages to and/or from other devices via a network such as the Internet.

Further, the disclosure comprises configurations according to the following clauses.

Clause 1. A computing system for simulating operational impact of planned maintenance, the computing system comprising: processing circuitry configured to: provide a plurality of operational models comprising: a route model comprising information describing a route schedule for a plurality of vehicles; a preparation model comprising information describing tasks to prepare a vehicle for departure; and a planned maintenance model comprising information describing a plurality of maintenance tasks, each maintenance task associated with information describing a task time; using the plurality of operational models, execute an operational simulation that generates interactions between a route simulation and a planned maintenance simulation for a plurality of routes in the route schedule, wherein executing the operational simulation comprises: simulating performance of a scheduled maintenance task for a vehicle of the plurality of vehicles; and determining an effect of the simulated performance of the scheduled maintenance task on the route simulation; and output the determined effect of the simulated performance.

Clause 2. The computing system of clause 1, wherein simulating the performance of the scheduled maintenance task comprises: determining a location to perform the scheduled maintenance task; and determining a simulated task time for performing the scheduled maintenance task using the information describing the task time corresponding to the scheduled maintenance task.

Clause 3. The computing system of clause 2, wherein determining the location to perform the scheduled maintenance task comprises: determining a time after which the scheduled maintenance task is required for the vehicle associated with the scheduled maintenance task to operate in the route simulation; and determining one or more candidate stations along routes of the vehicle associated with the scheduled maintenance task based on the time after which the scheduled maintenance task is required for the vehicle to operate in the route simulation.

Clause 4. The computing system of clause 3, wherein the scheduled maintenance task is associated with a station in the route schedule, and wherein determining the location to perform the scheduled maintenance task further comprises: deferring maintenance to a candidate station of the one or more candidate stations.

Clause 5. The computing system of clause 2, wherein the information describing the task times for the plurality of maintenance tasks comprises a probability distribution of task time for each maintenance task, and wherein determining the simulated task time comprises simulating a probabilistic drawing of the probability distribution corresponding to the scheduled maintenance task.

Clause 6. The computing system of clauses 1 to 5, wherein simulating the performance of the scheduled maintenance task comprises: determining a simulated maintenance time for performing the scheduled maintenance task, wherein the simulated maintenance time comprises a simulated task time and a simulated delay time, and wherein: the simulated task time is determined using the information describing the task time associated with the scheduled maintenance task; and the simulated delay time is determined based on available resources at a current station of a current route being simulated in the route simulation.

Clause 7. The computing system of clauses 1 to 6, wherein the scheduled maintenance task is provided by a scheduler that schedules a plurality of scheduled maintenance tasks for the plurality of vehicles to be simulated in the operational simulation.

Clause 8. The computing system of clause 7, wherein the scheduler reschedules the plurality of scheduled maintenance tasks after a predetermined event.

Clause 9. The computing system of clauses 1 to 8, wherein executing the operational simulation further comprises altering the route simulation based on the determined effect.

Clause 10. The computing system of clause 9, wherein altering the route simulation comprises altering a departure time of a route of the plurality of routes.

Clause 11. A method for simulating operational impact of planned maintenance, the method comprising: providing a plurality of operational models comprising: a route model comprising information describing a route schedule for a plurality of vehicles; a preparation model comprising information describing tasks to prepare a vehicle for departure; and a planned maintenance model comprising information describing a plurality of maintenance tasks, each maintenance task associated with information describing a maintenance time; using the plurality of operational models, executing an operational simulation that generates interactions between a route simulation and a planned maintenance simulation for a plurality of routes in the route schedule, wherein executing the operational simulation comprises: simulating performance of a scheduled maintenance task for a vehicle of the plurality of vehicles; and determining an effect of the simulated performance of the scheduled maintenance task on the route simulation; and outputting the determined effect of the simulated performance.

Clause 12. The method of clause 11, wherein simulating the performance of the scheduled maintenance task comprises: determining a location to perform the scheduled maintenance task; and determining a simulated task time for performing the scheduled maintenance task using the information describing the task time corresponding to the scheduled maintenance task.

Clause 13. The method of clause 12, wherein determining the location to perform the scheduled maintenance task comprises: determining a time after which the scheduled maintenance task is required for the vehicle associated with the scheduled maintenance task to operate in the route simulation; and determining one or more candidate maintenance stations along routes of the vehicle associated with the scheduled maintenance task based on the time after which the scheduled maintenance task is required for the vehicle to operate in the route simulation.

Clause 14. The method of clause 13, wherein the scheduled maintenance task is associated with a station in the route schedule, and wherein determining the location to perform the scheduled maintenance task further comprises: deferring maintenance to a candidate station of the one or more candidate stations.

Clause 15. The method of clause 12, wherein the information describing the task times for the plurality of maintenance tasks comprises a probability distribution of task time for each maintenance task, and wherein determining the simulated task time comprises simulating a probabilistic drawing of the probability distribution corresponding to the scheduled maintenance task.

Clause 16. The method of clauses 11 to 15, wherein simulating the performance of the scheduled maintenance task comprises: determining a simulated maintenance time for performing the scheduled maintenance task, wherein the simulated maintenance time comprises a simulated task time and a simulated delay time, and wherein: the simulated task time is determined using the information describing the task time associated with the scheduled maintenance task; and the simulated delay time is determined based on available resources at a current station of a current route being simulated in the route simulation.

Clause 17. The method of clauses 11 to 16, wherein the scheduled maintenance task is provided by a scheduler that schedules a plurality of scheduled maintenance tasks for the plurality of vehicles to be simulated in the operational simulation.

Clause 18. The method of clause 17, wherein the scheduler reschedules the plurality of scheduled maintenance tasks after a predetermined event.

Clause 19. The method of clauses 11 to 18, wherein executing the operational simulation further comprises altering the route simulation based on the determined effect.

Clause 20. A computing system for simulating operational impact of planned maintenance for a plurality of vehicles, the computing system comprising: processing circuitry configured to: execute an operational simulation that generates interactions between a route simulation and a planned maintenance simulation for a plurality of routes for the plurality of vehicles, wherein executing the operational simulation comprises: determining a current route of the plurality of routes being simulated in the route simulation; and upon determining that a scheduled maintenance task is required to be performed in the current route, simulating performance of the scheduled maintenance task, comprising: calculating maintenance time based on available resources, wherein the maintenance time comprises task time and delay time; determining an effect of the simulated performance of the scheduled maintenance task on the route simulation; and outputting the determined effect of the simulated performance.

"And/or" as used herein means any or all of multiple stated possibilities. For example, the phrase "element A and/or element B" covers embodiments having element A alone, element B alone, or elements A and B taken together.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system for simulating operational impact of planned maintenance, the computing system comprising: processing circuitry configured to:

provide a plurality of operational models comprising:
a route model comprising information describing a route schedule for a plurality of vehicles;
a preparation model comprising information describing tasks to prepare a vehicle for departure; and
a planned maintenance model comprising information describing a plurality of maintenance tasks, each maintenance task associated with information describing a task time, wherein the information describing the task times for the plurality of maintenance tasks comprises a probability distribution of task time for each maintenance task;

using the plurality of operational models, execute an operational simulation that generates interactions between a route simulation and a planned maintenance simulation for a plurality of routes in the route schedule, wherein executing the operational simulation comprises:
simulating performance of a scheduled maintenance task for a vehicle of the plurality of vehicles by:
performing a probabilistic drawing of the probability distribution of task time corresponding to the scheduled maintenance task to determine a simulated task time for performing the scheduled maintenance task; and
determining an effect of the simulated performance of the scheduled maintenance task on the route simulation; and visually output to a display device changes to the route simulation from the determined effect of the simulated performance of the scheduled maintenance task.

2. The computing system of claim 1, wherein simulating the performance of the scheduled maintenance task comprises:

determining a location to perform the scheduled maintenance task.

3. The computing system of claim 2, wherein determining the location to perform the scheduled maintenance task comprises:

determining a time after which the scheduled maintenance task is required for the vehicle associated with the scheduled maintenance task to operate in the route simulation; and determining one or more candidate stations along routes of the vehicle associated with the scheduled maintenance task based on the time after which the scheduled maintenance task is required for the vehicle to operate in the route simulation.

4. The computing system of claim 3, wherein the scheduled maintenance task is associated with a station in the route schedule, and wherein determining the location to perform the scheduled maintenance task further comprises:

deferring maintenance to a candidate station of the one or more candidate stations.

5. The computing system of claim 1, wherein the probability distributions of task time for the plurality of maintenance tasks comprise an asymmetric distribution.

6. The computing system of claim 1, wherein simulating the performance of the scheduled maintenance task comprises:

determining a simulated maintenance time for performing the scheduled maintenance task, wherein the simulated maintenance time comprises the simulated task time and a simulated delay time, and wherein:

the simulated delay time is determined based on available resources at a current station of a current route being simulated in the route simulation.

7. The computing system of claim 1, wherein the scheduled maintenance task is provided by a scheduler that schedules a plurality of scheduled maintenance tasks for the plurality of vehicles to be simulated in the operational simulation.

8. The computing system of claim 7, wherein the scheduler reschedules the plurality of scheduled maintenance tasks after a predetermined event.

9. The computing system of claim 1, wherein executing the operational simulation further comprises altering the route simulation based on the determined effect.

10. The computing system of claim 9, wherein altering the route simulation comprises altering a departure time of a route of the plurality of routes.

11. A method for simulating operational impact of planned maintenance, the method comprising:

providing a plurality of operational models comprising:

a route model comprising information describing a route schedule for a plurality of vehicles;

a preparation model comprising information describing tasks to prepare a vehicle for departure; and a planned maintenance model comprising information describing a plurality of maintenance tasks, each maintenance task associated with information describing a task time, wherein the information describing the task times for the plurality of maintenance tasks comprises a probability distribution of task time for each maintenance task;

using the plurality of operational models, executing an operational simulation that generates interactions between a route simulation and a planned maintenance simulation for a plurality of routes in the route schedule, wherein executing the operational simulation comprises:

simulating performance of a scheduled maintenance task for a vehicle of the plurality of vehicles by:

performing a probabilistic drawing of the probability distribution of task time corresponding to the scheduled maintenance task to determine a simulated task time for performing the scheduled maintenance task; and determining an effect of the simulated performance of the scheduled maintenance task on the route simulation; and visually outputting to a display device changes to the route simulation from the determined effect of the simulated performance of the scheduled maintenance task.

12. The method of claim 11, wherein simulating the performance of the scheduled maintenance task comprises:

determining a location to perform the scheduled maintenance task.

13. The method of claim 12, wherein determining the location to perform the scheduled maintenance task comprises:

determining a time after which the scheduled maintenance task is required for the vehicle associated with the scheduled maintenance task to operate in the route simulation; and determining one or more candidate maintenance stations along routes of the vehicle associated with the scheduled maintenance task based on the time after which the scheduled maintenance task is required for the vehicle to operate in the route simulation.

14. The method of claim 13, wherein the scheduled maintenance task is associated with a station in the route schedule, and wherein determining the location to perform the scheduled maintenance task further comprises:

deferring maintenance to a candidate station of the one or more candidate stations.

15. The method of claim 11, wherein the probability distributions of task time for the plurality of maintenance tasks comprise an asymmetric distribution.

16. The method of claim 11, wherein simulating the performance of the scheduled maintenance task comprises:

determining a simulated maintenance time for performing the scheduled maintenance task, wherein the simulated maintenance time comprises the simulated task time and a simulated delay time, and wherein:

the simulated delay time is determined based on available resources at a current station of a current route being simulated in the route simulation.

17. The method of claim 11, wherein the scheduled maintenance task is provided by a scheduler that schedules a plurality of scheduled maintenance tasks for the plurality of vehicles to be simulated in the operational simulation.

18. The method of claim 17, wherein the scheduler reschedules the plurality of scheduled maintenance tasks after a predetermined event.

19. The method of claim 11, wherein executing the operational simulation further comprises altering the route simulation based on the determined effect.

20. A computing system for simulating operational impact of planned maintenance for a plurality of vehicles, the computing system comprising:

processing circuitry configured to:

execute an operational simulation that generates interactions between a route simulation and a planned maintenance simulation for a plurality of routes for the plurality of vehicles, wherein executing the operational simulation comprises:

determining a current route of the plurality of routes being simulated in the route simulation;

upon determining that a scheduled maintenance task is required to be performed in the current route, simulating performance of the scheduled maintenance task, comprising:

performing a probabilistic drawing of a probability distribution of task time corresponding to the scheduled maintenance task to determine a simulated task time for performing the scheduled maintenance task; and calculating maintenance time based on available resources, wherein the maintenance time comprises the simulated task time and a delay time;

determining an effect of the simulated performance of the scheduled maintenance task on the route simulation; and visually outputting to a display device changes to the route simulation from the determined effect of the simulated performance of the scheduled maintenance task.

\* \* \* \* \*